United States Patent [19]

Sharp

[11] Patent Number: 5,136,594
[45] Date of Patent: Aug. 4, 1992

[54] METHOD AND APPARATUS FOR PROVIDING BUS PARITY

[75] Inventor: Ben L. Sharp, Fremont, Calif.

[73] Assignee: Acer Incorporated, Taiwan

[21] Appl. No.: 540,022

[22] Filed: Jun. 14, 1990

[51] Int. Cl.$^5$ .......................................... G06F 11/00
[52] U.S. Cl. .................. 371/49.1; 371/29.5; 371/49.2
[58] Field of Search ............. 371/49.1, 49.2, 29.5; 364/266.3, 945.6

[56] References Cited

U.S. PATENT DOCUMENTS

| | | | |
|---|---|---|---|
| 4,383,317 | 5/1983 | Haville | 371/49.1 |
| 4,511,975 | 4/1985 | Nozawa et al. | 371/49.1 |
| 4,644,546 | 2/1987 | Doi et al. | 371/49.1 |
| 4,737,949 | 4/1988 | Yammoto | 371/49.1 |
| 4,823,347 | 4/1989 | Chin et al. | 371/49.1 |
| 4,876,686 | 10/1989 | Sasaki et al. | 371/49.1 |
| 4,894,826 | 1/1990 | Aggers et al. | 370/85.1 |
| 5,033,050 | 7/1991 | Murai | 371/49.1 |

OTHER PUBLICATIONS

*Microprocessor Report*, vol. 2, No. 10, Oct. 1988.
*Microprocessor Report*, vol. 3, No. 7, Jul. 1989.
Slater, *Microprocessor-Based Design*, Chapter 4, pp. 173-252, Prentice-Hall, Englewood Cliffs, N.J., 1989.

*Primary Examiner*—Jerry Smith
*Assistant Examiner*—Ly V. Hua
*Attorney, Agent, or Firm*—Greg T. Sueoka

[57] ABSTRACT

A method for checking parity on, for example, an Extended Industry Standard Architecture (EISA) bus. In a 32-bit information bus, four parity pins may be provided. During a first clock cycle the pins are all driven high and during a second clock cycle the pins are all driven low. This characteristic pattern is detected by a slave device and provides an indication that parity data will be transmitted on the four parity pins. After an indication of parity support the pins are provided with parity bits for error detection.

11 Claims, 1 Drawing Sheet

METHOD AND APPARATUS FOR PROVIDING BUS PARITY

BACKGROUND OF THE INVENTION

The present invention relates to the field of computer systems. More specifically, in one embodiment the invention provides an improved method for providing bus parity between, for example, a microprocessor and peripherals, particularly in conjunction with a bus system such as the well known Extended Industry Standard Architecture (EISA) bus.

Over the last several years a variety of bus standards have been proposed or utilized for transmission of data and address signals over a bus in a computer system. One data standard which has been widely adopted is the Extended Industry Standard Architecture or "EISA." The EISA bus standard is described in "Microprocessor Report," July 1989, which is incorporated herein by reference for all purposes. Complete descriptions of the standard are readily available from BCPR Services, Inc. of Washington, D.C.

Implementation of the EISA bus standard and similar bus standards has presented a variety of problems. For example, as bus transfer speed between a processor and a peripheral piece of equipment is increased the probability that noise or other transient effects will occur during data transmission is substantially increased. The EISA bus standard does not presently provide for data integrity checks. One possible technique for providing bus parity would be to add a dedicated bus line which would be defined as a parity valid line. However, the number of spare pins provided in the EISA bus does not allow for such a conventional parity system as only four "manufacturer specific" pins are available. A conventional parity checking technique would need five pins for parity checks: four pins for byte-wide parity and one pin for transmitting a signal indicative of whether data parity is supported.

From the above it is seen that an improved system and method for providing bus parity would be desirable, particularly in conjunction with an EISA bus.

SUMMARY OF THE INVENTION

A method and apparatus for providing bus parity on a bus with a limited number of available pins is provided. In the example of the EISA bus, four EISA manufacturer-specific signal pins are utilized to transfer even, byte-wide parity bits. The invention determines whether data accesses support parity and checks integrity on, for example, the EISA bus. Common pins are used for indicating that parity is supported and for the parity checks themselves.

Accordingly, in one embodiment the invention provides a method of detecting support of parity in a bus system in a computer and for checking parity in bits provided to the bus by a bus master write. The method includes the steps of placing a first characteristic set of bits on a set of parity-designated pins from a master unit; detecting the presence of the first characteristic set of bits at a slave unit; placing a second characteristic set of bits on the set of parity-designated pins from the master unit; detecting the presence of the second characteristic set of bits at the slave unit, the first set of characteristic bits and the second set of characteristic bits indicating that the master unit supports parity; placing parity bits on the designated pins, the parity bits indicating the parity of bits placed on associated bus lines, the slave unit using the parity bits to detect errors when the master unit supports parity.

A further understanding of the nature and advantages of the invention herein may be realized by reference to the remaining portions of the specification and the attached drawing.

DESCRIPTION OF THE PREFERRED EMBODIMENTS

Figure 1:
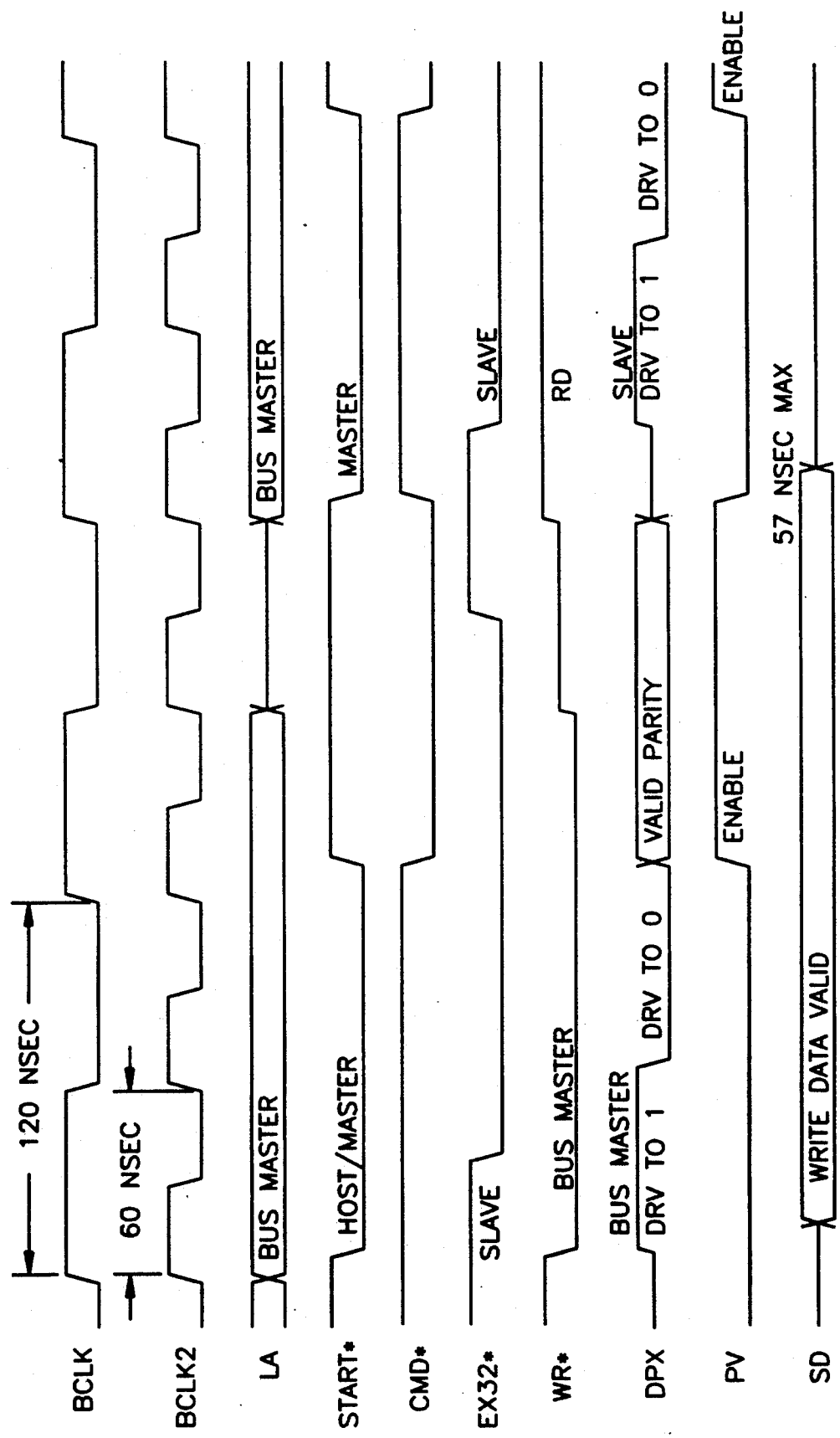
FIG. 1 is a timing diagram illustrating operation of the invention on an EISA bus.

The present invention provides for data parity checks during read and write cycles on a bus using a limited number of pins. For example, to check parity on a conventional EISA bus the invention utilizes only four pins. The invention provides for both a check to determine if parity is supported and a check for the data parity itself.

To determine if data parity is supported, the invention applies a predetermined pattern of voltages after an indication that, for example, an address bus contains a valid address. In the case of the EISA bus, four manufacturer-specific pins are utilized to support bus parity. On a master write data transfer, the bus master issues an EISA bus START* signal, indicating that the address on the bus is valid. At that time, from one to all four parity bits (on the manufacturer-specific pins) are driven high (logic 1) by the master. In alternative embodiments, the four parity bits are allowed to float high. In preferred embodiments pull-up resistors are utilized to ensure quick transitions to a given voltage level. At the next rising edge of a bus clock signal (BCLK in the case of the EISA bus) the START* signal is negated, and all of the parity bits are driven low (logic 0).

During the time when START* is active, a target which supports parity (which may be any one of a wide variety of target devices such as graphics devices, disk controllers, or the like) will monitor the parity bits for a high condition. After the BCLK and START* transitions the target will again monitor the parity bits, this time ensuring that all four bits are low or logic 0. If this pattern is detected, the target assumes that parity is supported. The bus master then drives the correct parity bits onto the four parity bit lines, along with the information on the EISA bus. Data are then checked for parity using any one of a wide variety of conventional means and appropriate action is taken if parity is not valid. Methods of checking parity in data and techniques for taking corrective action in response to an indication of invalid data are disclosed in, for example, Slater, "Microprocessor Based Design," (1989), which is incorporated herein by reference for all purposes. Parity errors are reported to the system processor on an appropriate line such as IOCHK* in the EISA bus.

While the invention is illustrated herein by way of checking for a high signal on a single pin followed by a low signal on all of the pins, it is to be understood that the invention is not so limited and that a wide variety of patterns could be utilized for determining if parity is supported. For example, exactly the reverse pattern could be utilized such that the target first looks for all pins to be low and then looks for one pin to be high. The particular pattern used herein for illustration is preferred because the bus will typically be not driven at this time, and may already be in the high state.

A bus master read data from a target follows essentially the same procedure in reverse. After the bus master issues the START* signal it waits for a slave response and then checks for one or more of the parity bits to be high. When the START* signal is negated and on the next rising edge of BCLK the bus master checks for all of the parity bits to be low. If they are all low the bus master has established that parity is supported and parity is checked when data are placed on the bus.

FIG. 1 is a timing diagram illustrating operation of the invention in greater detail. Table 1 illustrates all of the EISA bus pins, including those illustrated in FIG. 1. The four pins labelled "Mfg Specific" are used herein for parity checks.

TABLE 1
EISA/ISA Pin Assignments

| Pin No. | ISA Row B | EISA Row F | EISA Row E | ISA Row A |
|---|---|---|---|---|
| 1 | GND | GND | CMD* | IOCHK* |
| 2 | RESDRV | +5V | START* | $D_7$ |
| 3 | +5V | +5V | EXRDY | $D_6$ |
| 4 | $IRQ_9$ | Mfg Specific | EX32* | $D_5$ |
| 5 | −5V | Mfg Specific | GND | $D_4$ |
| 6 | $DRQ_2$ | Access Key | Access Key | $D_3$ |
| 7 | −12V | Mfg Specific | EX16* | $D_2$ |
| 8 | NOWS* | Mfg Specific | SLBURST* | $D_1$ |
| 9 | +12V | +12V | MSBURST* | $D_0$ |
| 10 | GND | M-IO | W-R | CHRDY |
| 11 | SMWTC* | LOCK* | GND | AEN |
| 12 | SMRDC* | Reserved | Reserved | $SA_{19}$ |
| 13 | IOWC* | GND | Reserved | $SA_{18}$ |
| 14 | IORC* | Reserved | Reserved | $SA_{17}$ |
| 15 | $DAK_3$* | $BE_3$* | GND | $SA_{16}$ |
| 16 | $DRQ_3$ | Access Key | Access Key | $SA_{15}$ |
| 17 | $DAK_1$* | $BE_2$* | $BE_1$* | $SA_{14}$ |
| 18 | $DRQ_1$ | $BE_0$* | LA31 | $SA_{13}$ |
| 19 | REFRESH* | GND | GND | $SA_{12}$ |
| 20 | BCLK | +5V | LA30 | $SA_{11}$ |
| 21 | $IRQ_7$ | $LA_{29}$ | $LA_{28}$ | $SA_{10}$ |
| 22 | $IRQ_6$ | GND | $LA_{27}$ | $SA_9$ |
| 23 | $IRQ_5$ | $LA_{26}$ | $LA_{25}$ | $SA_8$ |
| 24 | $IRQ_4$ | $LA_{24}$ | GND | $SA_7$ |
| 25 | $IRQ_3$ | Access Key | Access Key | $SA_6$ |
| 26 | $DAK_2$* | $LA_{16}$ | $LA_{15}$ | $SA_5$ |
| 27 | T/C | $LA_{14}$ | $LA_{13}$ | $SA_4$ |
| 28 | BALE | +5V | $LA_{12}$ | $SA_3$ |
| 29 | +5V | +5V | $LA_{11}$ | $SA_2$ |
| 30 | OSC | GND | GND | $SA_1$ |
| 31 | GND | $LA_{10}$ | $LA_9$ | $SA_0$ |
| | Row D | Row H | Row G | Row C |
| 1 | M16* | $LA_8$ | $LA_7$ | SBHE* |
| 2 | IO16* | $LA_6$ | GND | $LA_{23}$ |
| 3 | $IRQ_{10}$ | $LA_5$ | $LA_4$ | $LA_{22}$ |
| 4 | $IRQ_{11}$ | +5V | $LA_3$ | $LA_{21}$ |
| 5 | $IRQ_{12}$ | $LA_2$ | GND | $LA_{20}$ |
| 6 | $IRQ_{15}$ | Access Key | Access Key | $LA_{19}$ |
| 7 | $IRQ_{14}$ | $D_{16}$ | $D_{17}$ | $LA_{18}$ |
| 8 | $DAK_0$* | $D_{18}$ | $D_{19}$ | $LA_{17}$ |
| | Row D | Row H | Row G | Row C |
| 9 | $DRQ_0$ | GND | $D_{20}$ | MRDC* |
| 10 | $DAK_5$* | $D_{21}$ | $D_{22}$ | MWTC* |
| 11 | $DRQ_5$ | $D_{23}$ | GND | $D_8$ |
| 12 | $DAK_6$* | $D_{24}$ | $D_{25}$ | $D_9$ |
| 13 | $DRQ_6$ | GND | $D_{26}$ | $D_{10}$ |
| 14 | $DAK_7$* | $D_{27}$ | $D_{28}$ | $D_{11}$ |
| 15 | $DRQ_7$ | Access Key | Access Key | $D_{12}$ |
| 16 | +5V | $D_{29}$ | GND | $D_{13}$ |
| 17 | MASTER 16* | +5V | $D_{30}$ | $D_{14}$ |
| 18 | GND | +5V | $D_{31}$ | $D_{15}$ |
| 19 | — | $MAK_x$* | $MREQ_x$* | — |

As shown in FIG. 1, the master/slave operate under the direction of a clock signal BCLK which operates at a frequency of, for example, 8 MHz (120 ns per cycle). The signal BCLK2 is derived from BCLK and operates at a frequency of twice that of BCLK or about 16 MHz in the example provided herein. If one or more of the four parity pins (DPX) go high in the first half of the first cycle of BCLK and all of the pins go low in the last half of the first cycle of BCLK, it is assumed that parity is supported, and parity bits are placed on the DPX pins.

More specifically, when a falling edge of START* is detected the DPX pins are all driven high by a master that supports parity. At the next rising edge of BCLK2 the slave checks one or more of the pins to determine if the pin(s) are high as indicated at point 1 on the DPX line. Thereafter, when BCLK is low, after hold time from BCLK2, the DPX lines are all driven to 0 and at the following rising edge of BCLK2 the slave checks the DPX lines to determine if all of the parity lines are at 0, as indicated by point 2 on the DPX line. At this time the slave will recognize that the master supports parity and at the next rising edge of START* the appropriate parity bits are placed on the four DPX lines for access by the slave. At BCLK rising edge, while CMD* is low, the slave reads the parity bits on DPX and the data on the data lines SD. A read cycle in FIG. 1 is shown in an analogous manner.

The remaining pins shown FIG. 1 are standard EISA bus pins. CMD* is a timing BCS Jun. 4, 1990 control signal, within a cycle. EX32* provides an indication of whether 32-bit transfers are supported. If 32-bit transfers are not supported, in this example, parity is not checked. WR* is the write/read pin and indicated when data should be read from or written to the bus. PV is a parity-valid signal which is not on any pin, but is internally generated based on the sequence discussed above and indicates when parity is valid.

It is to be understood that the above description is intended to be illustrative and not restrictive. Many variations of the invention will become apparent to those of skill in the art upon review of this disclosure. Merely by way of example, while the invention is illustrated with regard to byte-wide parity detection systems the invention is not so limited since it could readily be used with word-wide parity checks or the like. By way of further example, the invention has been illustrated primarily with reference to the EISA bus, but the invention could readily be applied to other bus standards which do not readily support parity and which are limited in the number of available pins or could be applied to error correcting codes (ECC's) or the like. Alternatively, the system could be used to support address parity checks. The scope of the invention should, therefore, be determined not with reference to the above description, but instead should be determined with reference to the appended claims along with their full scope of equivalents.

What is claimed is:

1. In a computer system including a bus having a plurality of signal transmission means; a master device coupled to the bus for placing signals on the signal transmission means, and for reading signals therefrom; and a slave device coupled to the bus for placing signals on the signal transmission means, and for reading signals therefrom, a method of transmitting parity information from the master device to the slave device during a bus master write operation, said method comprising the steps of:

a) at the master device, placing a first characteristic set of signals on a set of parity-designated bus signal transmission means;

b) at the slave device, detecting the presence of said first characteristic set of signals on the set of parity-designated bus signal transmission means;
c) at the master device, placing a second characteristic set of signals on said set of parity-designated bus signal transmission means;
d) at the slave device, detecting the presence of said second characteristic set of signals on the set of parity-designated bus signal transmission means, the sequence of said first set of characteristic signals followed by said second set of characteristic signals indicating to the slave device that said master device will be transmitting parity data on the set of parity-designated bus signal transmission means;
e) at the master device, placing parity data on the set of parity-designated bus signal transmission means, said parity data indicating parity of bits placed on associated bus signal transmission means; and
f) at the slave device, receiving the parity data from the set of parity-designated bus signal transmission means, and receiving the bits from the associated bus signal transmission means, and using said parity data to detect errors in bits received on the associated bus signal transmission means only when said master device has previously indicated that it would be transmitting parity on the set of parity-designated bus signal transmission means.

2. The method as recited in claim 1 wherein said associated bus signal transmission means are data bus signal transmission means.

3. The method as recited in claim 1 wherein said first characteristic set of signals is indicated by driving at least one of said parity-designated bus signal transmission means high and said second characteristic set of signals is indicated by driving all of said parity-designated bus signal transmission means low.

4. The method as recited in claim 1 wherein said parity-designated bus signal transmission lines comprise four bus signal transmission lines, said four bus signal transmission lines providing byte-wide parity checks for a 32-bit information bus.

5. The method as recited in claim 4 wherein said four bus signal transmission lines are designated as manufacturer-specific pins.

6. The method as recited in claim 4 wherein said parity data are used only if said slave device is capable of receiving 32-bit transfers.

7. The method as recited in claim 1 wherein said first characteristic set of signals is providing during a first half of a clock cycle and said second characteristic set of signals is provided during a second half of the clock cycle.

8. The method as recited in claim 7 wherein said parity data are placed on said parity-designated bus signal transmission means during a second clock cycle.

9. The method of claim 1, wherein the step of at the master device, placing a first characteristic set of signals on a set of parity-designated bus signal transmission means is performed during a first half of a clock cycle in which at the master device, a start signal is placed on a corresponding start signal transmission means, and wherein further, the step of at the slave device, detecting the presence of said first characteristic set of signals on the set or parity-designated bus signal transmission means is performed during a first half of a clock cycle in which at the slave device, the start signal is detected on the corresponding start signal transmission means.

10. In a computer system including a bus having a plurality of signal transmission means; a master device coupled to the bus for placing signals on the signal transmission means, and for reading signals therefrom; and a slave device coupled to the bus for placing signals on the signal transmission means, and for reading signals therefrom, a method of transmitting parity information from the slave device to the master device during a bus master read operation comprising the steps of:
a) at the slave device, placing a first characteristic set of signal on a set of parity-designated bus signal transmission means;
b) at the master device, detecting the presence of said first characteristic set of signals on the set of parity-designated bus signal transmission means;
c) at the slave device, placing a second characteristic set of signal on said set of parity-designated bus signal transmission means;
d) at the master device, detecting the presence of said second characteristic set of signals on the set of parity-designated bus signal transmission means, the sequence of said first set of characteristic signals followed by said second set of characteristic signals indicating to the master device that said slave device will be transmitting parity data on the set of parity-designated bus signal transmission means;
e) at the slave device, placing parity data on the set of parity-designated bus signal transmission means, said parity data indicating parity of bits placed on associated bus signal transmission means; and
f) at the master device, receiving the parity data from the set of parity-designated bus signal transmission means, and receiving the bits from the associated bus signal transmission means, and using said parity data to detect errors in bits received on the associated bus signal transmission means only when said slave device has previously indicated that it would be transmitting parity on the set of parity-designated bus signal transmission means.

11. The method of claim 10, wherein the step of at the slave device, placing a first characteristic set of signals on a set of parity-designated bus signal transmission means is performed during a first half of a clock cycle in which at the master device, a start signal is placed on a corresponding start signal transmission means, and wherein further, the step of at the master device, detecting the presence of said first characteristic set of signals on the set of parity-designated bus signal transmission means is performed during a first half of the clock cycle in which at the master device, the start signal is placed on the corresponding start signal transmission means.

* * * * *

UNITED STATES PATENT AND TRADEMARK OFFICE
CERTIFICATE OF CORRECTION

PATENT NO. : 5,136,594

DATED : Aug. 4, 1992

INVENTOR(S) : Ben L. Sharp

It is certified that error appears in the above-identified patent and that said Letters Patent is hereby corrected as shown below:

Col. 4, line 26, delete "BCS Jun. 4, 1990".

Claim 7, column 5, line 49, "providing" should be --provided--.

Signed and Sealed this

Thirty-first Day of August, 1993

Attest:

BRUCE LEHMAN

Attesting Officer

Commissioner of Patents and Trademarks